C. P. S. Wardwell,
Tenoning Machine.

Nº 11,625.　　　　　　　Patented Aug. 29, 1854.

Witnesses:
John Aldrich Jr
B. F. Osgood

Inventor:
Chas P. S. Wardwell

UNITED STATES PATENT OFFICE.

CHARLES P. S. WARDWELL, OF LAKE VILLAGE, NEW HAMPSHIRE.

MACHINE FOR CUTTING TENONS.

Specification of Letters Patent No. 11,625, dated August 29, 1854.

*To all whom it may concern:*

Be it known that I, CHARLES P. S. WARDWELL, of Lake Village, in the county of Belknap and State of New Hampshire, have invented a new and useful Improvement in Machines for Cutting Square Tenons on Bedstead-Rails, &c.; and I do hereby declare that the following is a full, clear, and exact description of the same, reference being had to the accompanying drawings, forming part of this specification, in which—

Figure 3:
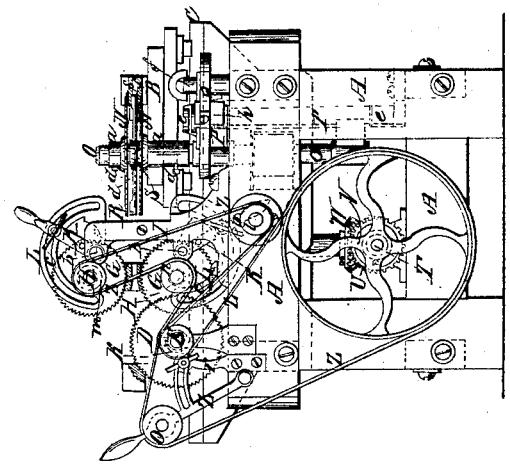
Figure 1:
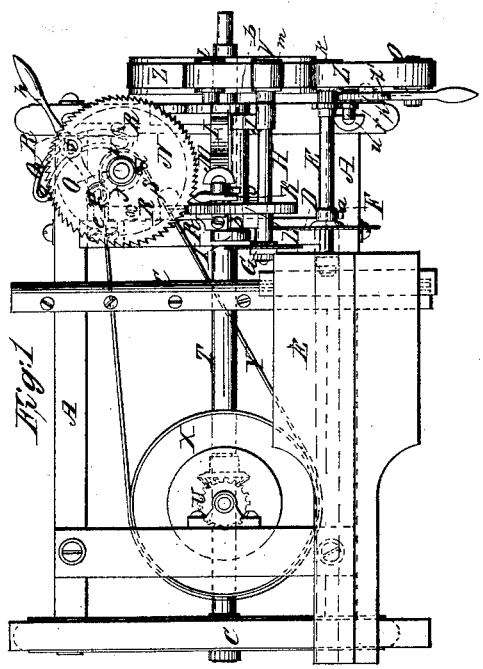
Figure 2:
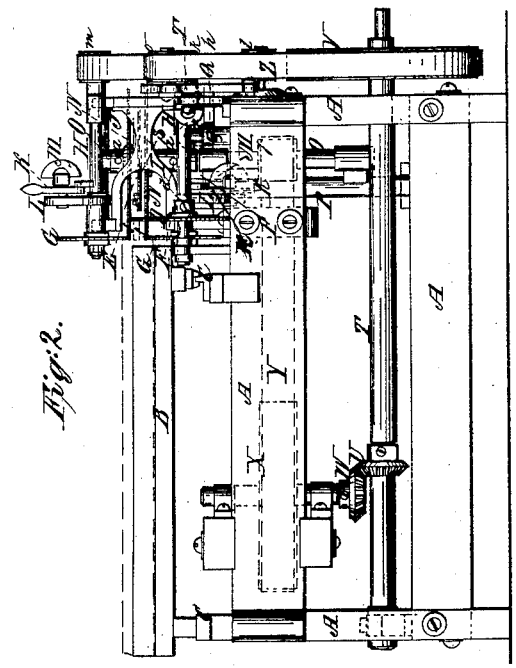

Figure 1, is a plan or top view of a tenoning machine with my improvements. In this view, the machine is represented as just commencing to operate upon the rail. Fig. 2, is a side elevation of the machine. In this view the rail is shown as having the tenons cut on it, and ready for removal. Fig. 3, is an end elevation of the same.

Similar letters of reference in each of the several figures indicate corresponding parts.

The first part of this invention relates to a novel manner, hereinafter described of arranging and combining the several main parts of the machine, said parts consisting of the vertical saw for squaring off the end of the rail, vertical saws for forming the tenon shoulders, and the horizontal saws, or saws and cutters combined, for cutting the tenons. By thus combining and arranging these parts, I dispense with the use of a separate machine for cutting the shoulders, as my machine is rendered capable of completing the tenon before the rail is reversed to have its other end tenoned, or before it is discharged from the machine; and consequently, a considerable saving in expense and labor is effected, and withal, the machine is rendered capable of doing more work in a given time, and in a perfect manner, than any other machine now in use for a similar purpose.

The second part of this invention relates to a peculiar manner of arranging the vertical shoulder saws, and horizontal tenon saws; whereby either of the said vertical saws can be adjusted, so as to cut the required depth of shoulder, and also the horizontal saws, or saws and cutters combined, so as to compensate for their wear.

The third part of my invention relates to the employment of one or more cutters between the horizontal tenon saws, in combination with the shoulder saws. By this arrangement, two or more tenons can be cut on each end of the rail at one operation, as will be hereinafter seen.

To enable others skilled in the art to make and use my invention, I will proceed to describe its construction and operation.

A, represents the frame of the machine, made of wood, or other suitable material, and of oblong form, as shown in the drawing.

B, is the feed carriage, which moves transversely over the top of the machine, on the ways, C, C.

D, is the saw for squaring off the end of the rail: it is arranged on the arbor, E, as shown in the drawing. This saw is situated near the front part of the machine, and made to bear a near relation to the end of the feed carriage, so as to be capable of sawing off the rough end of the rail before it passes to the shoulder saws.

F, is a hub, to which the squaring off saw is attached. By thus attaching the saw to this hub, it can be moved toward or from the carriage, or adjusted to suit the various lengths of the tenons. *a*, is a set screw for holding the hub and saw firmly in place while sawing.

G, G, are the vertical shoulder saws. Each of them is secured fast on one end of the arbors, H, H, and stands very near the edge of the feed carriage, as shown in the drawing. Their arbors are hung a short distance behind the arbor of the saw, D, so that the rail, I, shall not come in contact with the saws, G, G, until its end has been squared; also, that the parts may not interfere with one another. These saws serve for forming the shoulders on the rail, one cutting the lower, and the other the upper shoulder on the rail, as illustrated in the drawing.

I, is a stationary metal stand, mounted on top of the frame, A. This stand serves for sustaining the arbors, H, H, of the saws, or rather for receiving the journals, *b*, *b*, of the swinging frames, J, J, which sustain and carry the arbors, H, H, as shown in the drawing. These frames are capable of turning on their axes, *b*, *b*, when it is desired to move the saws farther apart, or bring them closer together, or adjust them so as to cut a shoulder of greater or less depth.

K, K, are levers or arms attached to the swinging frames, and

L, L, are segments having curved slots, c, c, cut in them. Each of these segments is attached by one of its ends to the stand, I, in the manner shown in the drawing.

M, M, are set screws passing through the levers or arms, K, K, and the slots, c, c, in the segments. The slotted segments, L, L, allow of the saws, G, G, being adjusted as desired, and the screws serve for holding them firmly in place after being adjusted and while sawing.

N, N, represent the horizontal tenoning saws, attached to hubs, a, a, and secured by set screws, d, d, on the vertical spindle or arbor, O, as represented. These saws are so arranged that the lower face of one stands, when the machine is not in operation, even with the extremity of the lowest teeth of the upper saw, G, and the lower face of the other even with the extremity of the highest teeth of the lower saw, G, and consequently, when the machine is in operation, the pieces slitted off by these saws, will be of just the same thickness as the depth of the shoulders formed by the saws, G, G. By examining Fig. 2, of the drawing, the operation of the saws, N, N, in combination with the saws, G, G, will be clearly seen—a rail being shown in red lines, with tenons cut on one of its ends and ready to be reversed, so as to have its other end tenoned. By loosening the set secrews which secure the hubs, a, a, the saws, N, N, can be moved farther apart, or nearer together; they being adjusted thus whenever the saws, G, G, are adjusted, to cut a shoulder of greater or less depth. The spindle or arbor, O, turns in a swinging frame, P, which has its journals turning in the bearings, e, e, which are attached to the frame, A, as shown in the drawing.

Q, Fig. 1, is a slotted segment attached to the swinging frame, P, and to the frame, A, by the set screw, f, which passes loosely through its curved slot, g, as represented. This segment has an arm, h, cast on it, by which it is moved as desired. The slot in the segment allows of the saws, N, N, being adjusted in the arc of a circle, when necessary to compensate for their wear, and the set screw serves for securing the segment, and preventing it moving after the saws, N, N, have been adjusted, and while sawing. By this arrangement, the saws can be adjusted very quick, and with ease.

R, R, are two cutters, arranged between the saws, on a disk, S, which is attached to the hub, a, as represented, by said hub and the set screw, d, secured on spindle, O, and turn with the same. A space, the same width as the required tenons, is left between the edge of each cutter and saw, as represented. These cutters are employed when it is desired to form two tenons, s, s, on each end of the rail, after the manner shown in the drawings in red. The manner in which these cutters operate will be evident from the drawing.

T, represents the main horizontal driving shaft, which extends from one end, A, of the frame to the other, and has a bevel wheel, V, arranged on it, near one of its ends, and a driving wheel, V, on its other end. The bevel wheel, U, gears into another bevel wheel, W, on the vertical shaft which carries the horizontal driving pulley, X.

Y, is a band passing round this pulley, and leading to a pulley, j, on the arbor of the tenon saws, as represented in the drawing. This band gives motion to the tenon saws.

Z, is a band for giving motion to the saw, D, and the vertical saws, G, G,—this band is shown in red, and is arranged round the pulleys v, k, l, m, n, o, in the manner shown in Fig. 3.

Z', is a lever having the pulley, o, attached to it. This lever has a slotted segment, p, cast on it; u, is a set screw passing through the slot of the segment, p, and the metal standard, r. By means of this slotted segment lever, the pulley, o, can be moved toward or from the saws, and consequently the band, Z, can be tightened or slackened, as desired.

The operation of this machine is as follows: The machine being set in operation, the rail to be tenoned is placed on the carriage in the manner shown in Fig. 2, the carriage is then moved toward the saws, the rail coming first in contact with the saw, D, which squares off the end of the rail; 2d, in contact with the two saws, G, G, which form the shoulders, as represented in Figs. 2 and 3, in red; and 3d, in contact with the tenon saws, or saws and cutters combined, as represented. The movement of the carriage is continuous until the tenon or tenons have been completed. The rail being perfectly tenoned on one of its ends, is reversed, and the carriage returned to its former place when the operation of tenoning the other end of the rail commences, and is carried on in the same manner as just described.

What I claim as my invention, and desire to secure by Letters Patent, is:—

1. The manner herein described, of combining and arranging the squaring off saw, D, vertical shoulder saws, G, G, and horizontal tenon saws, N, N, or horizontal saws and cutters combined, so as to constitute a machine which is capable of completing the tenon or tenons before the rail is discharged, substantially as, and for the purpose herein described.

2. I claim the manner herein described, of combining and arranging the saw arbor, H. or O; swinging frame, J, or P; slotted segment, L, or Q; lever, K, or h, and set screw, M, or f, for the purpose of facilitating the operation of adjusting the shoulder saws, G, G, of tenoning saws, N, N, substantially as herein described.

3. I claim the employment of one or more cutters between the horizontal tenon saws, N, N, in combination with the shoulder saws, G, for the purpose of cutting two or more tenons on each end of the rail at one operation, substantially as herein described.

CHAS. P. S. WARDWELL.

Witnesses:
JOHN ALDRICH, Jr.,
B. F. OSGOOD.